United States Patent
Muthusamy et al.

(10) Patent No.: US 11,700,568 B2
(45) Date of Patent: *Jul. 11, 2023

(54) DYNAMIC MAPPING OF NODES RESPONSIBLE FOR MONITORING TRAFFIC OF AN EVOLVED PACKET CORE

(71) Applicant: Gigamon Inc., Santa Clara, CA (US)

(72) Inventors: Rakesh Muthusamy, Sunnyvale, CA (US); Tushar R. Jagtap, Fremont, CA (US); Ujjvala Nangineni, Los Altos, CA (US); Kristian Pereira, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,483

(22) Filed: Jun. 30, 2021

(65) Prior Publication Data

US 2021/0329531 A1 Oct. 21, 2021

Related U.S. Application Data

(63) Continuation of application No. 16/696,693, filed on Nov. 26, 2019, now Pat. No. 11,057,820.

(51) Int. Cl.
*H04W 40/24* (2009.01)
*H04W 24/08* (2009.01)
(Continued)

(52) U.S. Cl.
CPC ......... *H04W 40/246* (2013.01); *H04W 24/08* (2013.01); *H04W 40/30* (2013.01); *H04W 88/16* (2013.01)

(58) Field of Classification Search
None
See application file for complete search history.

(56) References Cited

U.S. PATENT DOCUMENTS 10,448,268 B1 * 10/2019 Jaya ..................... H04W 76/19
11,057,820 B2 * 7/2021 Muthusamy ............ H04L 41/12
(Continued)

FOREIGN PATENT DOCUMENTS

WO 2016186885 A2 11/2016

OTHER PUBLICATIONS

Ericsson et al.: Clarifications to CP/UP function, Node, PFCP entity and PFCP Association concepts; 3GPP TSG-CT WG4 Meeting #89, Montreal, Canada, Feb. 25-Mar. 1, 2019; 6 pages.
(Continued)

*Primary Examiner* — Brian S Roberts
(74) *Attorney, Agent, or Firm* — Perkins Coie LLP (57) ABSTRACT

Introduced here are visibility platforms able to process the traffic handled by the gateways of an Evolved Packet Core (EPC) with Control and User Plane Separation (CUPS). A visibility platform can include a control processing node (CPN) and one or more user processing nodes (UPNs). The visibility platform may populate a data structure in which the CPN and UPNs are associated with locations along an interface on which Sx/N4 traffic is exchanged between the control and user planes. Each location may be representative of the point on the Sx/N4 interface at which Sx/N4 traffic processed by the corresponding node is acquired. The CPN can use the data structure to program session flows that impact how user traffic is handled by the UPNs.

20 Claims, 9 Drawing Sheets (51) Int. Cl.
  *H04W 40/30* (2009.01)
  *H04W 88/16* (2009.01)

(56)  References Cited

U.S. PATENT DOCUMENTS

| | | |
|---|---|---|
| 2016/0157274 A1 | 6/2016 | Akiyoshi |
| 2018/0159898 A1 | 6/2018 | Gibson et al. |
| 2019/0059010 A1* | 2/2019 | Ghosh .................. H04W 72/04 |
| 2019/0075032 A1 | 3/2019 | Young et al. |
| 2019/0104023 A1 | 4/2019 | Rimar et al. |
| 2019/0306755 A1 | 10/2019 | Chaudhuri et al. |
| 2020/0107213 A1 | 4/2020 | Park et al. |
| 2020/0351626 A1 | 11/2020 | Libby et al. |
| 2021/0250844 A1* | 8/2021 | Hu .......................... H04W 4/23 |

OTHER PUBLICATIONS

Extended European Search Report in European Application No. 20205080.3; dated Mar. 23, 2021; 7 pages.
Notice of Allowance dated May 24, 2021 for U.S. Appl. No. 16/696,693, 14 pages; dated May 24, 2021.
EP Office Action dated May 6, 2022 for European Application No. 20205080.3, 5 pages., dated May 6, 2022.
Extended European Search Report in European Application No. 20205080.3; dated Feb. 6, 2023; 5 pages.

* cited by examiner

DYNAMIC MAPPING OF NODES RESPONSIBLE FOR MONITORING TRAFFIC OF AN EVOLVED PACKET CORE

CROSS-REFERENCE TO RELATED APPLICATION

This application is a continuation of U.S. patent application Ser. No. 16/696,693, titled "DYNAMIC MAPPING OF NODES RESPONSIBLE FOR MONITORING TRAFFIC OF AN EVOLVED PACKET CORE" and filed on Nov. 26, 2019, issued as U.S. Pat. No. 11,057,820 on Jul. 6, 2021, which is incorporated by reference herein in its entirety.

TECHNICAL FIELD

At least one embodiment of the present disclosure pertains to techniques for mapping the nodes of a visibility platform to the gateways of an Evolved Packet Core (EPC) employed by an operator.

BACKGROUND

Evolved Packet Core (EPC) is a framework for providing voice and data on a single network architecture. Historically, network architectures processed traffic through two separate subdomains: circuit-switched for voice and packet-switched for data. However, EPC unifies voice and data on an Internet Protocol (IP) architecture, so that operators (also referred to as "wireless service providers," "cellular companies," or "carriers") can support various access networks with a single data network. Examples of access networks include 2G, 3G, WLAN, WiMAX, and Long-Term Evolution (LTE).

Figure 1:
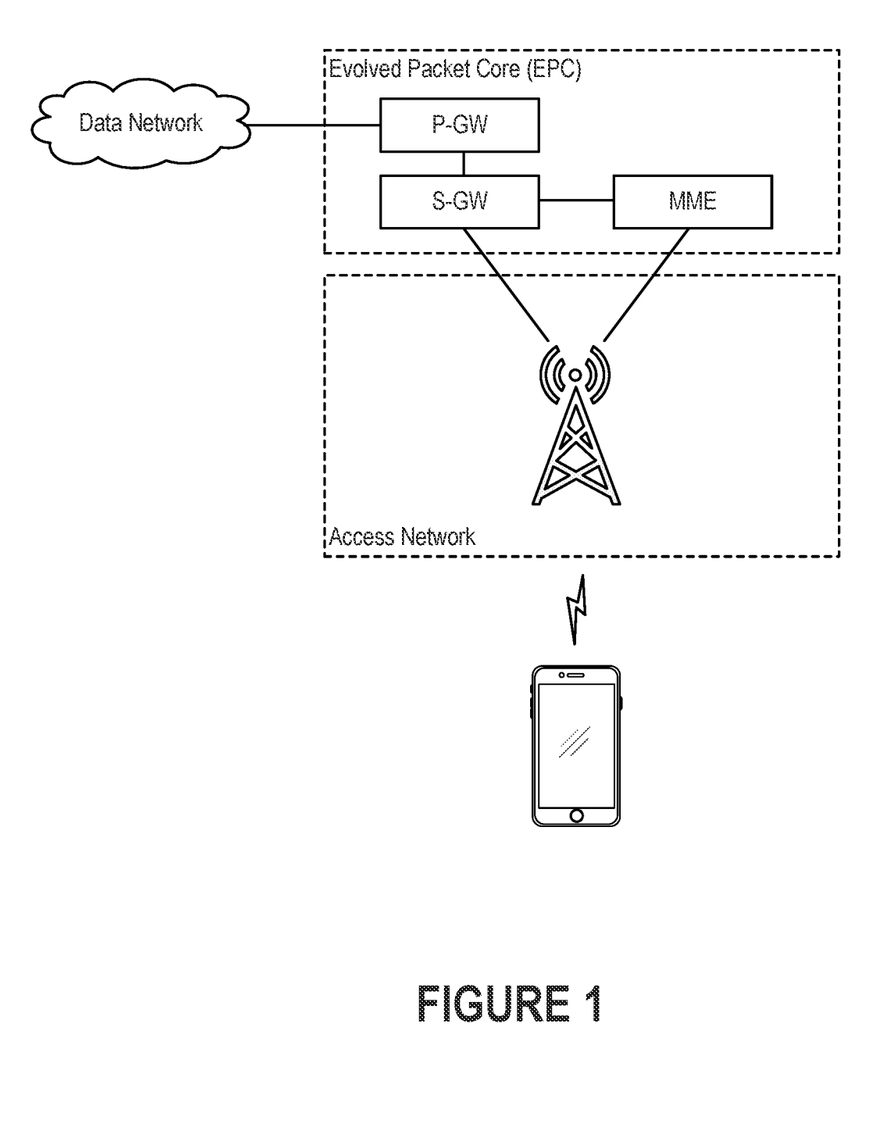
FIG. 1 includes a high-level illustration of a network architecture showing how a piece of user equipment can be connected to an Evolved Packet Core (EPC) via an access network.

FIG. 1 includes a high-level illustration of a network architecture showing how a piece of user equipment can be connected to the EPC via an access network. As shown in FIG. 1, the principal components of the EPC are (1) a mobility management entity (MME) that authenticates pieces of user equipment as those pieces of user equipment establish a session; (2) a serving gateway (S-GW) that forwards packets through the access network; and (3) a packet data network gateway (P-GW) that acts as an interface between the access network and the data network (also referred to as the "core network").

The EPC was designed to have a "flat" architecture so that traffic could be efficiently handled from the performance and cost perspectives. Historically, the MME has dealt with traffic associated with the control plane, while the S-GW and P-GW have dealt with traffic associated with the user and control planes. Because of this functional split, operators have been able to adapt/scale the EPC as necessary.

As mobility becomes a more ubiquitous part of life, resource demands are changing rapidly. Generally, the resources consumed by the control plane are attributable to signaling (e.g., due to the initiation of sessions by new pieces of user equipment), while the resources consumed by the user plane are attributable to the consumption of data. Past demands involved a relatively predictable level of resources for the control and user planes. However, increased variations in resource demands are being observed across these planes. The EPC was introduced to address this challenge with a degree of separation between the control plane and the user plane. But as the makeup of the access networks continue to evolve, the need for further separation of these planes has become apparent.

Control and User Plane Separation (CUPS) provides the ability to scale the control plane and the user plane independently of one another on an as-needed basis in real time. As such, CUPS is a more cost-effective approach to improving the underlying network architecture over time. CUPS allows operators to specialize the user plane for different applications without incurring the cost of a dedicated control plane for each application. Moreover, CUPS enables operators to optimize data center costs by hosting the control plane and the user plane in different geographical locations, as well as save on backhaul costs by terminating data at the edge of the data network.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitation in the drawings, in which like references may indicate similar elements.

DETAILED DESCRIPTION

Introduced here are visibility platforms able to separately tap the traffic handled by the gateways of an Evolved Packet Core (EPC) with Control and User Plane Separation (CUPS). A visibility platform can include at least one control processing node (CPN) able to process traffic handled by gateways in the control plane (referred to as "control gateways") and at least one user processing node (UPN) able to process traffic handled by gateways in the user plane (referred to as "user gateways"). The visibility platform may be designed to populate a data structure, such as a table, to programmatically associate the CPNs and UPNs with one another. For example, the visibility platform may create a data structure by linking the Internet Protocol (IP) address of each node with an IP address corresponding to a location on the Sx/N4 interface between the control and user planes. Such action enables the visibility platform to dynamically program the UPNs with flow instructions that indicate how the incoming user traffic should be handled.

For many operators, traffic has been doubling on an annual basis in recent years. Reasons for this growth in traffic include the rapidly increasing use of network-connected electronic devices (also referred to as "smart devices" or "pieces of user equipment") and the proliferation of data-intensive applications. The trend of increasing traffic is expected to continue as the number of network-connected electronic devices increases and the interest in content-rich multimedia services, such as streaming services and telecommunications services, rises. Operators have begun employing CUPS to improve the experience of users.

CUPS is essential to new networks (e.g., 5G) because it allows operators to separate the EPC into a control plane that sits in a centralized location and a user plane (also referred to as the "data plane") that sits closer to its supported applications. For example, the control plane may be located in a data center that resides in the middle of the United States, while the user plane may be located in a series of data centers that are distributed throughout the United States.

Figure 2:
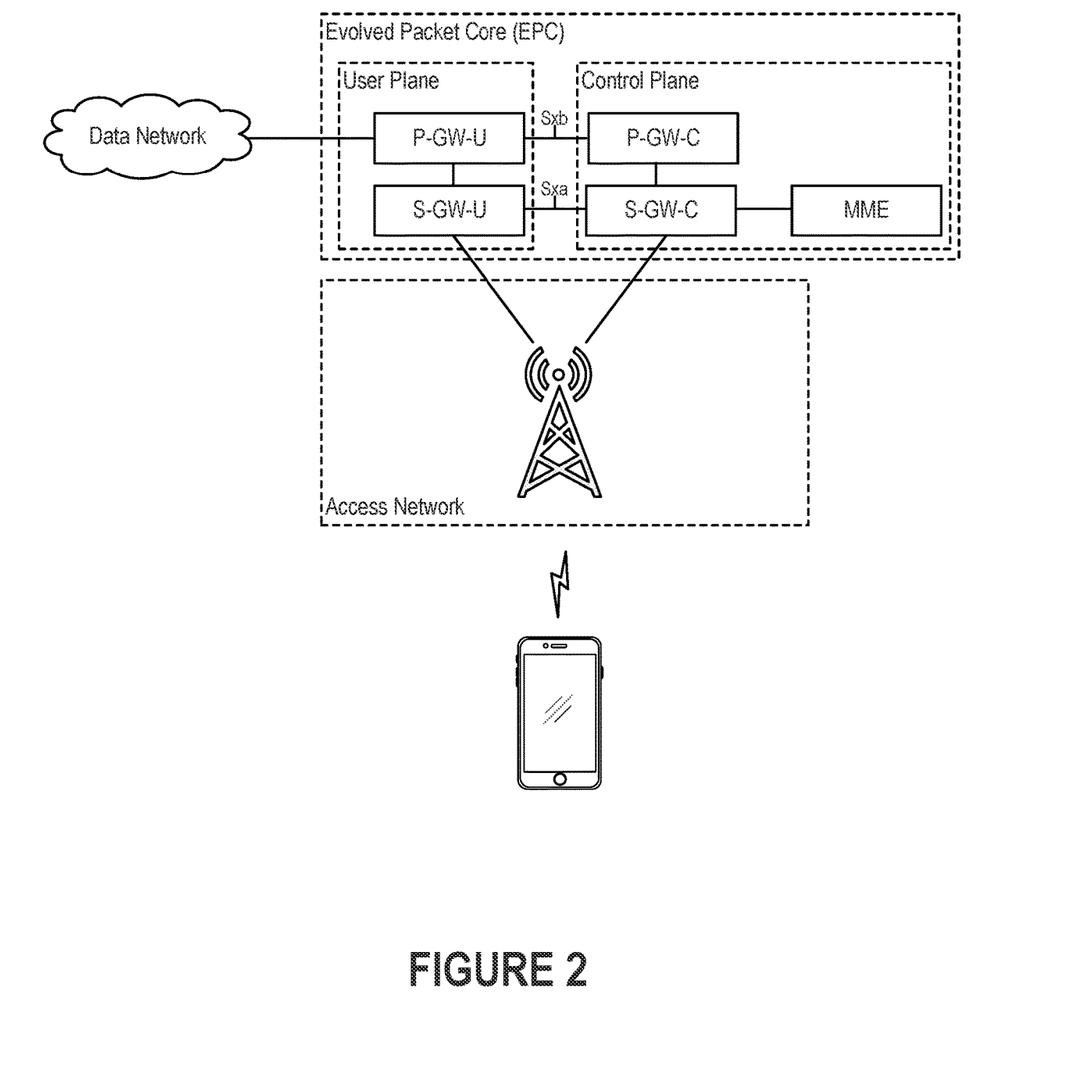
FIG. 2 includes a high-level illustration of a network architecture showing how a piece of user equipment can be connected to an EPC with Control and User Plane Separation (CUPS) via an access network.

FIG. 2 includes a high-level illustration of a network architecture showing how a piece of user equipment can be connected to an EPC with CUPS via an access network. When CUPS is implemented, the serving gateway (S-GW) and the packet data network gateway (P-GW) are logically separated into a pair of gateways (S-GW-U and P-GW-U) in the user plane and a pair of gateways (S-GW-C and P-GW-C) in the control plane. Here, the user plane includes a single pair of gateways and the control plane includes a single pair of gateways. However, as the demand for data by pieces of user equipment on the access network increases, the operator may opt to increase the number of gateways in the user plane.

CUPS introduces an interface (also referred to as the "Sx/N4 interface") between the control and user planes. As shown in FIG. 2, the Sx/N4 interface can include one or more sub-interfaces. Here, for example, a first sub-interface (Sxa) extends between the packet data network gateway in the control plane and the packet data network gateway in the user plane, while a second sub-interface (Sxb) extends between the serving gateway in the control plane and the serving gateway in the user plane.

Several benefits are achieved by separating the control and user planes. First, operators can independently scale the control and user planes. For example, an operator may add pairs of gateways in the user plane as the bandwidth available to the pieces of user equipment on the access network decreases. Second, operators can specialize the user plane for different applications without incurring the cost of a dedicated control plane for each application. And third, operators can optimize data center costs by hosting the control plane and the user plane in different geographical locations. For example, an operator may opt to host gateways in the control plane in a single location (e.g., for security purposes) while gateways in the user plane may be distributed throughout a much broader geographical area (e.g., to reduce the latency experienced by users).

Often, it is desirable to analyze the traffic in the control and user planes to improve decision making with respect to network operations, security techniques, etc. However, acquiring, processing, and examining the traffic in the control and user planes is difficult when the traffic is handled by gateways located in different geographical locations.

Introduced here, therefore, are visibility platforms able to separately tap the traffic handled by the gateways of an EPC with CUPS, regardless of where those gateways are located.

A visibility platform can include at least one CPN and at least one UPN. Each CPN may be associated with a pair of gateways (i.e., P-GW-C and S-GW-C) in the control plane, and each UPN may be associated with a pair of gateways (i.e., P-GW-U and S-GW-U) in the user plane. The number of UPNs may be based on the demand for data by the pieces of user equipment on the access network managed by the EPC with CUPS. When the demand for data increases, the operator may choose to expand the EPC by adding pairs of gateways in the user plane. Accordingly, some embodiments of the visibility platform include a single CPN and multiple UPNs, while other embodiments of the visibility platform include multiple CPNs and multiple UPNs.

Collectively, the CPNs and UPNs may be referred to as the "nodes" of the visibility platform. As further discussed below, the visibility platform may be designed to dynamically populate a data structure, such as a table, to programmatically associate the nodes with one another. For example, the visibility platform may create a data structure by linking the Internet Protocol (IP) address of each node with an IP address corresponding to a location on the Sx/N4 interface between the control and user planes. The location may be representative of the point on the Sx/N4 interface at which traffic processed by the corresponding node is acquired. Said another way, the location may be representative of the point at which the corresponding node accesses the Sx/N4 interface. The data structure can be hosted on, or is made accessible to, the CPN. This enables the CPN to program session flows on remote UPNs that have been identified based on an examination of the data structure.

Although embodiments may be described in the context of an EPC with CUPS, the technology is similarly applicable to 5G Next Generation Mobile Core Networks (5GCs). In the 5GC, the Sx/N4 interface allows traffic to be exchanged between the Session Management Function (SMF) and the User Plane Function (UPF). While a visibility platform designed to monitor the traffic handled by a 5GC may be structurally similar to a visibility platform designed to monitor the traffic handled by an EPC with CUPS, the visibility platform will separately tap the traffic handled by the SMF, UPF, and Sx/N4 interface. Note that the SMF may still be part of the "control plane," while the UPF may still be part of the "user plane."

Visibility Platform Architecture

Figure 3:
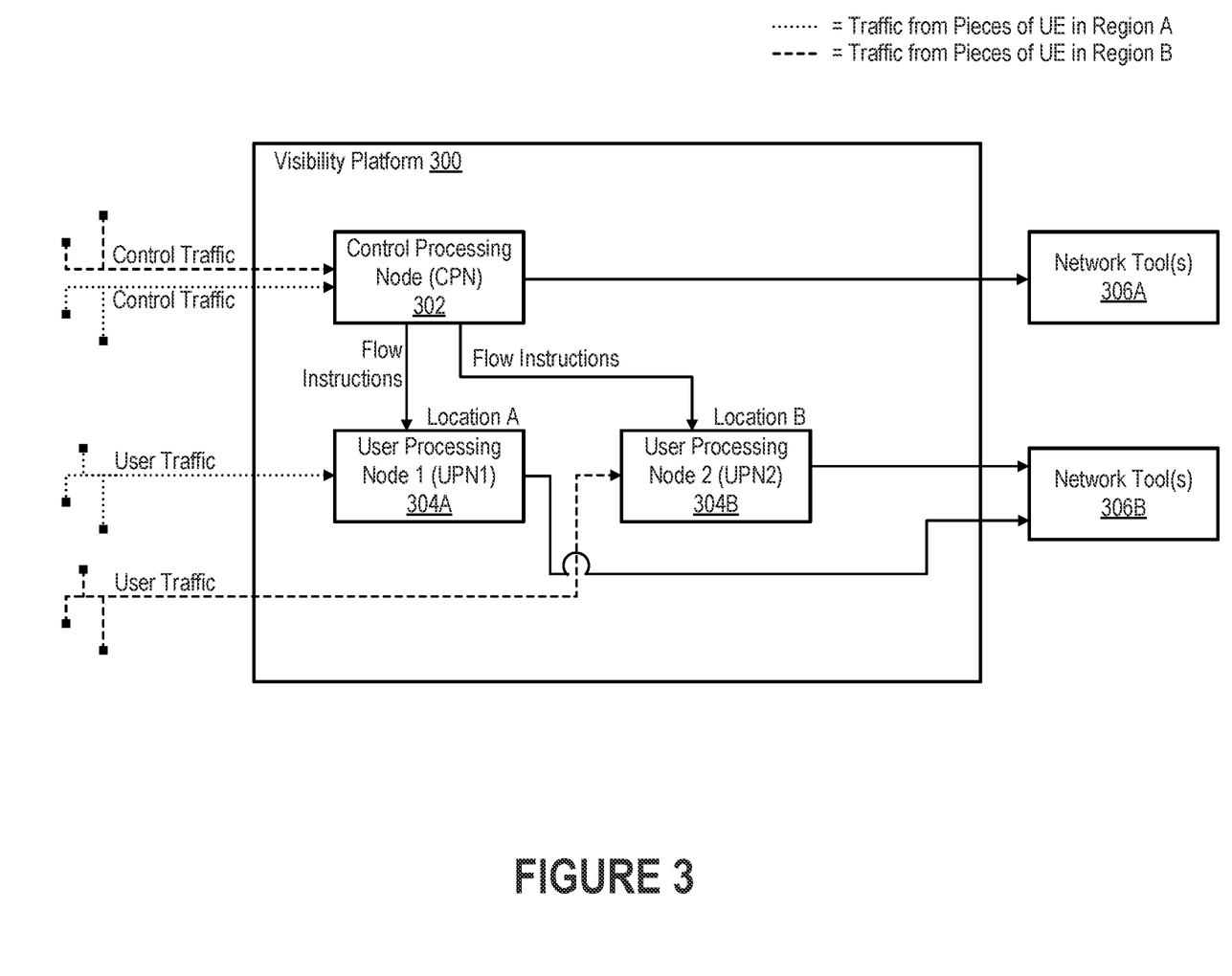
FIG. 3 depicts an example of a visibly platform that processes the traffic of an EPC with CUPS.

FIG. 3 depicts an example of a visibly platform 300 that processes the traffic of an Evolved Packet Core (EPC) with Control and User Plane Separation (CUPS). Such an arrangement enables the traffic handled by the control and user planes to be tapped separately. Here, for example, the control traffic associated with pieces of user equipment located in two geographical regions (Region A, Region B) is routed to control processing node (CPN) 302. Meanwhile, the user traffic (also referred to as "data traffic") associated with the pieces of user equipment located in Region A is routed to a first user processing node (UPN1) 304A and the user traffic associated with pieces of user equipment located in Region B is routed to a second user processing node (UPN2) 304B. Generally, UPN1 304A and UPN2 304B are located near Regions A and B, respectively, to reduce the latency experienced by the pieces of user equipment. CPN 302 may be located in Region A, Region B, or another location altogether (e.g., Region C). With such an arrangement, the user traffic originating from a given piece of user equipment could be handled by UPN1 304A and UPN2 304B at different points in time (e.g., as the user travels from Region A to Region B), though the control traffic originating from the given piece of user equipment may be handled by CPN 302 regardless of the location of the user.

As shown in FIG. 3, CPN 302 may be configured to forward at least some of the control traffic to one or more network tools 306A for further analysis. Similarly, UPN1 304A and UPN2 304B may be configured to forward at least some of the user traffic to one or more network tools 306B for further analysis. The visibility platform 300 and these network tools 306A-B may be operable as in-band (i.e., "inline") components or out-of-band components. Out-of-band components operate outside of the path of traffic between an origination node and a destination node, and thus receive copies of the packets that make up the traffic rather than the original packets. Out-of-band components are able to freely modify the copies of the packets because the original packets are allowed to traverse the data network unimpeded. Inline components, on the other hand, operate within the path of traffic between an origination node and a destination node, and thus receive the original packets.

In some embodiments, these network tools 306A-B are hosted locally as part of the visibility platform 300. For example, CPN 302 and its network tool(s) 306A may reside on the same computer server. In other embodiments, these network tools 306A-B are hosted remotely (e.g., within an on-premises computing environment controlled by an operator).

The network tool(s) through which packets should be routed may be specified in a flow instruction that is based a characteristic of the traffic, such as its protocol, origin, destination, etc. For example, UPN2 304B may separate incoming user traffic into different protocols (e.g., Transmission Control Protocol (TCP) and User Datagram Protocol (UDP), or Hypertext Transfer Protocol (HTTP), Secure Shell (SSH), and File Transfer Protocol (FTP)) and then forward the batches of packets to different series of network tools for analysis. As another example, UPN2 304B may separate incoming user traffic based on its origination and then forward the batches of packets to different series of network tools for analysis.

Generally, these flow instructions are programmed by CPN 302. Accordingly, CPN 302 may need to communicate flow instructions to UPN1 304A and UPN2 304B so that incoming user traffic is forward to the appropriate network tool(s) for analysis. However, the geographical separation of the nodes of the visibility platform 300 has made it much more difficult to understand the architecture of the visibility platform 300.

Dynamic Mapping of Control and User Processing Nodes

Figure 4:
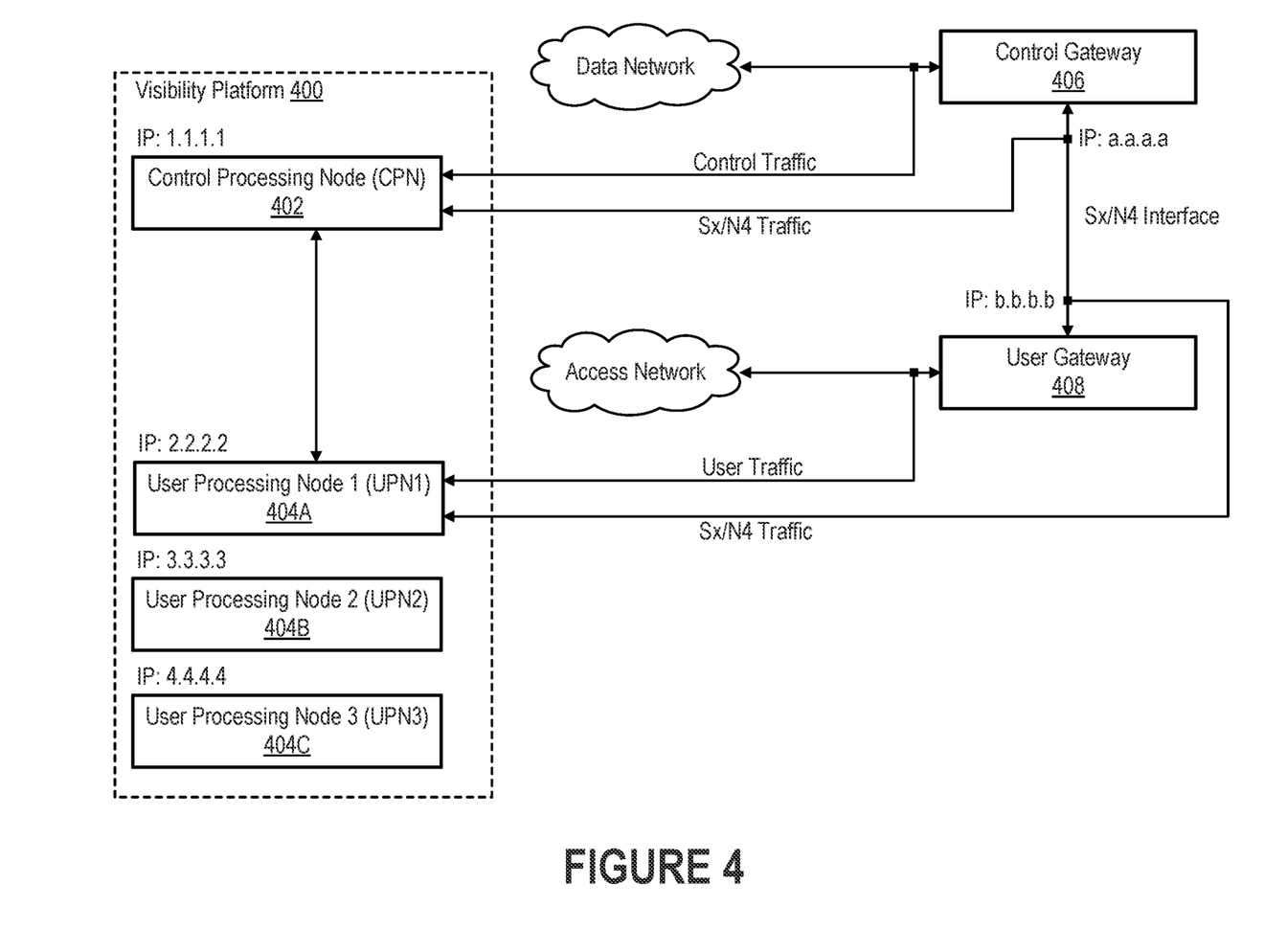
FIG. 4 includes a high-level block diagram that illustrates how a visibility platform can programmatically associate its nodes with one another in a dynamic manner.

FIG. 4 includes a high-level block diagram that illustrates how a visibility platform 400 can programmatically associate its nodes with one another in a dynamic manner. Here, the visibility platform 400 includes a control processing node (CPN) 402 and three user processing nodes (UPNs) 404A-C. However, the visibility platform 400 could include any number of CPNs and UPNs.

As discussed above with respect to FIG. 3, the visibility platform 400 can deployed such that it processes the traffic of an Evolved Packet Core (EPC) with Control and User Plane Separation (CUPS). This traffic includes control traffic representative of Correlation of the control and user traffic can be accomplished by CPN 402 programming session flows on an appropriate UPN. The appropriate UPN may be determined based on a data structure that associates or "maps" information regarding the Sx/N4 interface to each UPN of the visibility platform 400. Such a feature enables CPN 402 to identify the UPNs in a dynamic manner based on incoming traffic tapped at the Sx/N4 interface. However, as further discussed below, this feature may require a static mapping of the Internet Protocol (IP) addresses of the nodes to locations along the Sx/N4 interface.

Figure 5:
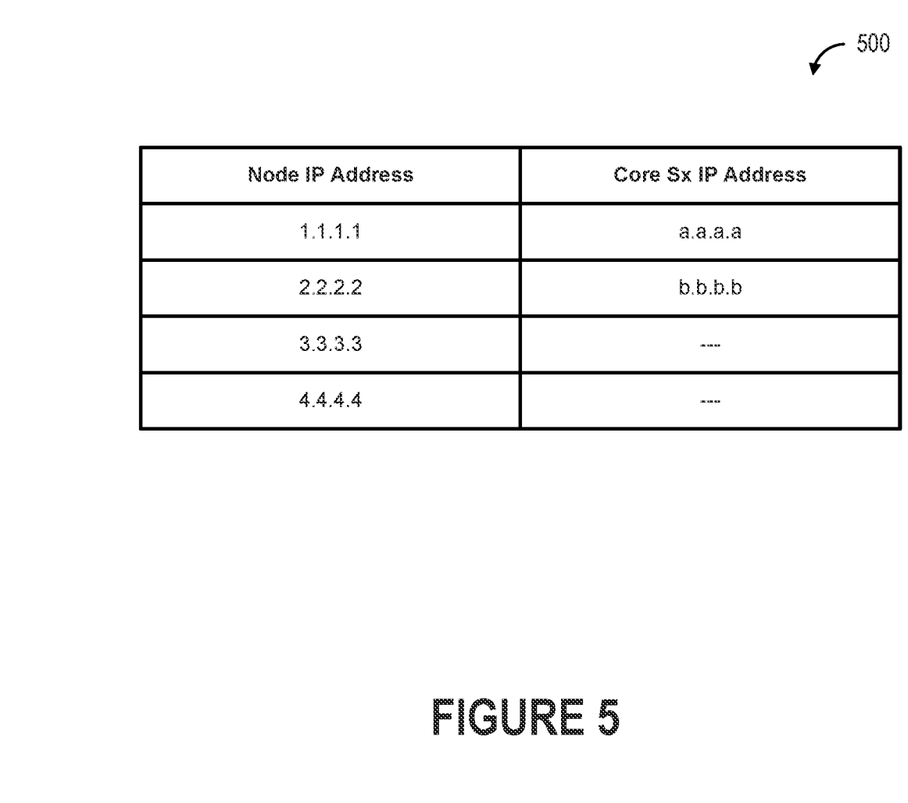
FIG. 5 depicts an example of a data structure in which addresses of nodes are associated with addresses corresponding to locations along the Sx/N4 interface.

Initially, CPN 402 can create a data structure in which each node is programmatically associated with a location along the Sx/N4 interface. For example, CPN 402 may automatically create and/or populate entries in a table by linking the IP address of each node with an IP address representative of a location along the Sx/N4 interface. In some embodiments, this is manually completed by an administrator. The location may be representative of the point at which Sx/N4 traffic (also referred to as "session traffic") processed by the corresponding node is accessed. For example, the location may be representative of the point at which Sx/N4 traffic is tapped by a tapping device (also referred to as a "tapping component" or "tapping agent") and then forwarded to the corresponding node. Here, for instance, CPN 402 acquires Sx/N4 traffic that has been tapped at a location along the Sx/N4 interface corresponding to IP address a.a.a.a. Accordingly, CPN 402 may create an entry (also referred to as a "record") in which the CPN IP address (i.e., IP address 1.1.1.1) is linked to the appropriate Sx/N4 IP address (i.e., IP address a.a.a.a). As another example, UPN1 404A acquires Sx/N4 traffic that has been tapped at a location along the Sx/N4 interface corresponding to IP address b.b.b.b. Accordingly, CPN 402 may create an entry in which the UPN1 IP address (i.e., 2.2.2.2) is linked to the appropriate Sx/N4 IP address (i.e., IP address b.b.b.b). An example of a data structure that includes these associations is shown in FIG. 5.

The data structure can be stored in a memory accessible to CPN 402. For example, if CPN 402 is a computer server, the data structure may be saved in the memory of CPN 402. In some embodiments, CPN 402 is one of multiple CPNs included in the visibility platform 400. In such embodiments, the data structure may be saved in each of the multiple CPNs.

Thereafter, packets representative of control traffic can be processed by CPN 402, while packets representative of user traffic can be processed by the UPNs 404A-C. These packets may be the original packets (i.e., the control and user traffic itself) or duplicate copies of the original packets depending on how the visibility platform 400 is deployed.

Over time, Sx/N4 traffic will be communicated between the control and user planes through the Sx/N4 interface. For example, a control gateway 406 may transmit information related to session management to a user gateway 408 in the form of Sx/N4 traffic, and the user gateway 408 may transmit information related to event reporting to the control gateway 406 in the form of Sx/N4 traffic. As shown in FIG. 2, Sx/N4 traffic may be accessed along the Sxa or Sxb sub-interfaces of the Sx/N4 interface. Thus, the control gateway 406 may be a serving gateway in the control plane if the user gateway 408 is a serving gateway in the user plane, or the control gateway 406 may be a packet data network gateway in the control plane if the user gateway 408 is a packet data network gateway in the user plane. Packets representative of the Sx/N4 traffic may be provided to CPN 402 for processing as shown in FIG. 4. These packets may be the original packets (i.e., the Sx/N4 traffic itself) or duplicate copies of the original packets.

As packets representative of Sx/N4 traffic are acquired by CPN 402, CPN 402 can use the data structure to discover which UPN should be programmed with a flow instruction. More specifically, CPN 402 may examine the data structure to discover the IP address of the UPN that is responsible for processing the user traffic associated with the Sx/N4 traffic acquired by CPN 402. For example, assume that CPN 402 acquires a packet that was tapped at a location along the Sx/N4 interface corresponding to IP address a.a.a.a. In such a scenario, CPN 402 can examine the packet to discover its destination and/or origin. Here, CPN 402 has discovered that the destination of the packet is IP address b.b.b.b. CPN 402 can then examine the data structure to identify a matching IP address. In this example, CPN 402 will discover that IP address has been programmatically associated with UPN1 404A in the data structure. Then, CPN 402 can program a session flow on UPN1 404A by transmitting a flow instruction to UPN1 404A using its IP address (i.e., IP address 2.2.2.2). The flow instruction may specify the network tool(s) through which user traffic matching a criterion should be routed. Alternatively, UPN 1 404A may determine which network tool(s) through which the user traffic should be routed based on the flow instruction. Thus, the decision to choose network tool(s) may be performed by UPN1 404A itself.

One disadvantage of using static data structures (also referred to as "profile configurations") is that manual intervention is necessary to edit traffic flows, tapping information, etc. For example, if an administrator is interested in altering the locations at which control traffic and/or user traffic is tapped, the mapping of nodes of the visibility will need to be recomputed (and the updated data structure will need to be synchronized across all CPNs). Another disadvantage is that logic representing the existing programmatic associations will fail if traffic is tapped inside virtual points of delivery (PODs) that dynamically allocate IP addresses.

Figure 6:
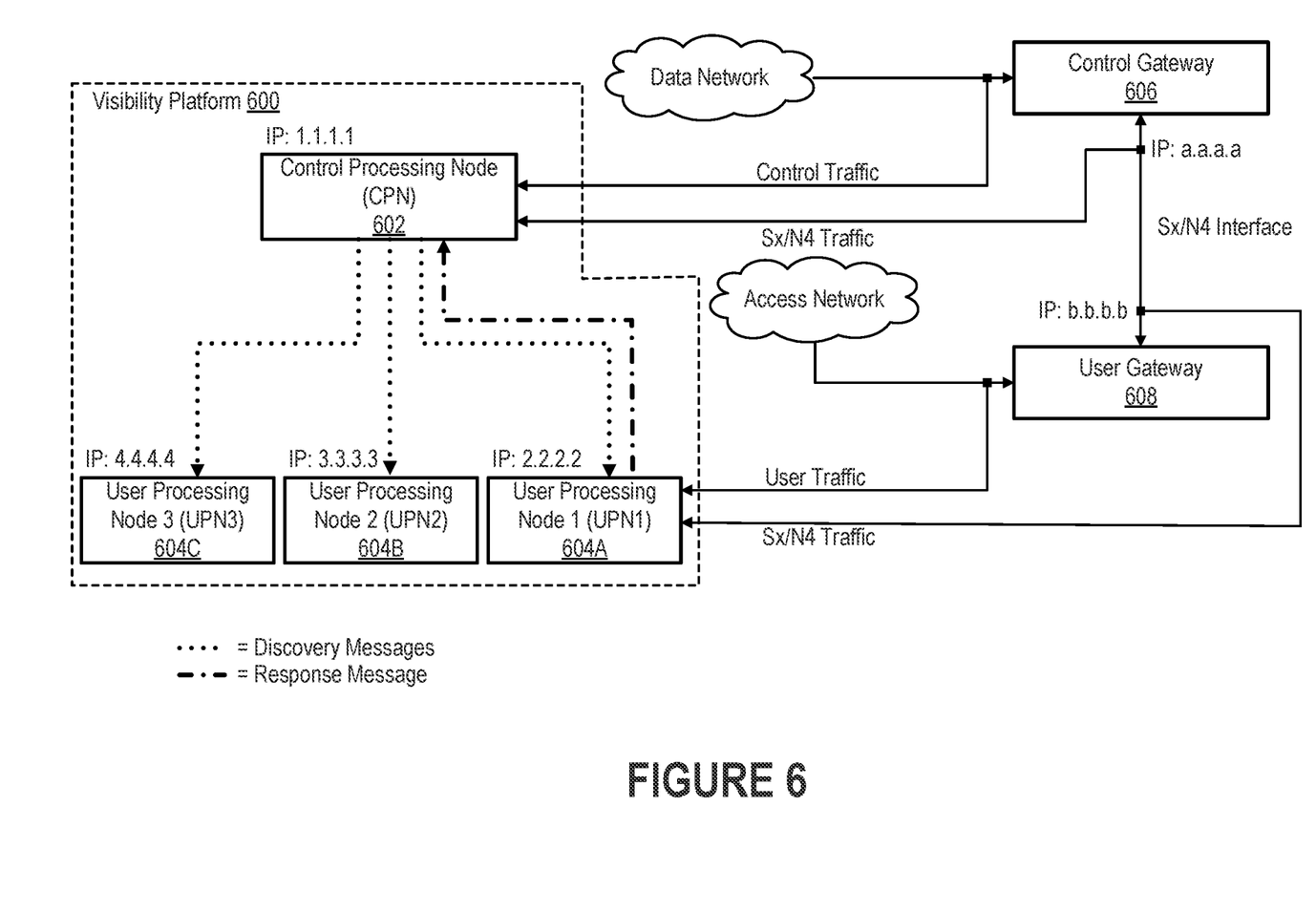
FIG. 6 includes a high-level block diagram that illustrates how a visibility platform can automatically learn how to programmatically associate its nodes with one another.

FIG. 6 includes a high-level block diagram that illustrates how a visibility platform 600 can automatically learn how to programmatically associate its nodes with one another. In contrast to the visibility platform 400 of FIG. 4, the visibility platform 600 of FIG. 6 can programmatically associate the nodes in a dynamic manner using parameters of Sx/N4 traffic without statically-defined profiles of traffic flow.

Such an approach has several benefits. First, the approach allows the CPN 602 to dynamically program the UPNs 604A-C with session flows to correlate GRPS Tunneling Protocol (GTP) traffic. For instance, CPN 602 may program the UPNs 604A-C with flow instructions to correlate GTP-U traffic that carries user data within the data network and between the access network and the data network. Second, the approach ensures that CPN 602 no longer needs to rely on statically-defined profiles of traffic flow. And third, the approach allows CPN 602 to correlate traffic in virtual environments.

Initially, CPN 602 can process packets representative of control traffic handled by a control gateway 606. Over time, Sx/N4 traffic will be communicated between the control and user planes through the Sx/N4 interface. For example, the control gateway 606 may transmit information related to session management to a user gateway 608 in the form of Sx/N4 traffic, and the user gateway 608 may transmit information related to event reporting to the control gateway 606 in the form of Sx/N4 traffic.

As packets representative of Sx/N4 traffic are acquired by CPN 602, CPN 602 can transmit a discovery message (also referred to as a "discovery inquiry") to a multicast group of which UPNs 604A-C are members to identify which UPN should be programmed with a flow instruction. For example, assume that CPN 602 acquires a packet that was tapped at a location along the Sx/N4 interface corresponding to IP address a.a.a.a. In such a scenario, CPN 602 can examine the packet to discover its destination and/or origin. Here, CPN 602 has discovered that the destination of the packet is IP address b.b.b.b. CPN 602 can then send a discovery message to the IP address of a multicast group of which UPNs 604A-C are members. All UPNs of the visibility platform 600 may be programmed to listen on the multicast IP address.

Upon receiving the discovery message, each UPN can determine whether the information regarding the tapping location along the Sx/N4 matches its own information. For example, each UPN can compare the Sx/N4 IP address (i.e., IP address b.b.b.b) to locally-stored information related to its tapping location along the Sx/N4 interface. One of the UPNs 604A-C will discover that the Sx/N4 IP address matches its own locally-stored information. Here, for example, UPN1 604A has determined that its locally-stored information indicates that it is responsible for processing Sx/N4 traffic tapped at IP address b.b.b.b. Accordingly, UPN1 604A has responded to the discovery message with a response message that indicates it is the UPN that is associated with the user gateway 608.

The discovery and response messages may include three fields: a first field that includes the CPN IP address (i.e., IP address 1.1.1.1); a second field that includes the Sx/N4 IP address of interest (i.e., IP address b.b.b.b); and a third field that includes the UPN IP address. The discovery message transmitted by CPN 602 may include the multicast IP address in the third field, while the response message transmitted by UPN1 604A may include the UPN1 IP address (i.e., IP address 2.2.2.2) in the third field.

Following receipt of the response message, CPN 602 may program a session flow on UPN1 604A by transmitting a flow instruction to UPN1 604A using its IP address (i.e., IP address 2.2.2.2). Additionally or alternatively, CPN 602 may build a data structure that can be used to program session flows as discussed above with respect to FIGS. 4-5. For example, following the exchange described above, CPN 602 may create and/or populate an entry in a table by linking the IP address of UPN1 604A with the IP address corresponding to the location along the Sx/N4 interface at which traffic processed by UPN1 604A is tapped. Such an approach allows CPN 602 to dynamically create new entries in the data structure as new user gateways are added. Rather than wait for modifications to be manually completed by an administrator, CPN 602 can automatically alter the data structure as it detects new IP addresses in the Sx/N4 traffic.

Figure 7:
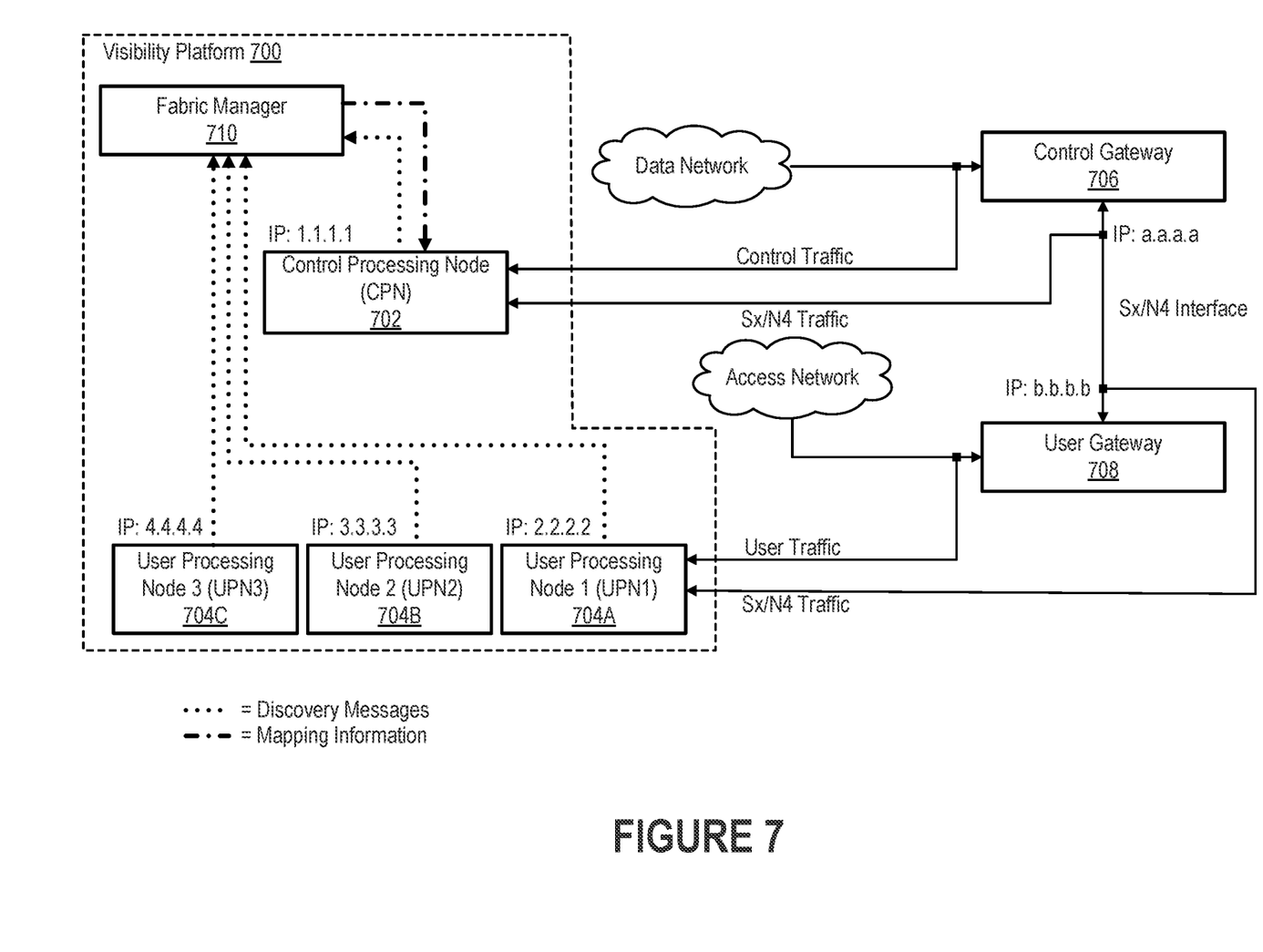
FIG. 7 includes a high-level block diagram that illustrates how a visibility platform may employ a fabric manager to facilitate the process by which its nodes are programmatically associated with one another.

FIG. 7 includes a high-level block diagram that illustrates how a visibility platform 700 may employ a fabric manager 710 to facilitate the process by which its nodes are programmatically associated with one another. Such an approach offers similar benefits as the visibility platform 600 of FIG. 6. Here, however, the fabric manager 710 is responsible for some tasks that were previously performed by the CPN. The fabric manager 710 may be an appliance (e.g., comprised of hardware components and/or virtual components) through which an administrator can manage the visibility platform 700 as a whole. For example, the administrator may be able to add new nodes, remove existing nodes, etc.

Initially, CPN 702 can process packets representative of control traffic handled by a control gateway 606. Over time, Sx/N4 traffic will be communicated between the control and user planes through the Sx/N4 traffic. For example, the control gateway 706 may transmit information related to session management to a user gateway 708 in the form of Sx/N4 traffic, and the user gateway 708 may transmit information related to event reporting to the control gateway 706 in the form of Sx/N4 traffic.

As packets representative of Sx/N4 traffic are acquired by CPN 702, CPN 702 can transmit a discovery message to the fabric manager 710. The discovery message may be representative of a request to specify which UPN is associated with the user gateway from which the Sx/N4 traffic originates or to which the Sx/N4 traffic is destined.

In some embodiments, the fabric manager 710 transmits another discovery message to a multicast group of which UPNs 704A-C are members to identify the appropriate UPN. For example, assume that CPN 702 acquires a packet that was tapped at a location along the Sx/N4 interface corresponding to IP address a.a.a.a. In such a scenario, CPN 702 can examine the packet to discover its destination and/or origin. Here, CPN 702 has discovered that the destination of the packet is IP address b.b.b.b. CPN 702 can then send a discovery message to the fabric manager 710 that specifies the Sx/N4 IP address of interest (i.e., IP address b.b.b.b). Then, the fabric manager 710 can send another discovery message to the IP address of a multicast group of which UPNs 704A-C are members. Whichever UPN determines that the Sx/N4 IP address of interest matches its locally-stored information can respond to the discovery message with a response message.

In other embodiments, the UPNs 704A-N are programmed to transmit discovery messages to the fabric manager 710 that specify where traffic being processed by those UPNs is being tapped along the Sx/N4 interface traffic. Here, for example, UPN1 704A may transmit a discovery message that specifies the Sx/N4 IP address of interest (i.e., IP address b.b.b.b), while UPN2 704B and UPN3 704C may transmit discovery messages that specify other IP addresses representative of tapping locations along the Sx/N4 interface.

The fabric manager 710 can build a data structure that can be used to program session flows as discussed above with respect to FIGS. 4-5. Following receipt of the discovery messages from CPN 702 and UPNs 704A-C, the fabric manager 710 may create and/or populate entries in a table by linking the IP addresses of these nodes with the IP addresses corresponding to the locations along the Sx/N4 interface at which traffic processed by these nodes is tapped. Here, for example, the fabric manager 710 may create a first entry that associates the CPN IP address (i.e., IP address 1.1.1.1) with IP address a.a.a.a, a second entry that associated the UPN1 IP Address (i.e., IP address 2.2.2.2) with IP address b.b.b.b, etc.

The fabric manager 710 may transmit the data structure to at least some of the nodes of the visibility platform 700. In some embodiments, the fabric manager 710 only transmits the data structure to the CPNs of the visibility platform 700. In other embodiments, the fabric manager 710 transmits the data structure to all nodes (i.e., CPNs and UPNs) of the visibility platform 700.

Thereafter, CPN 702 can use the data structure to program session flows on the UPNs 704A-C. For example, CPN 702 may program a session flow on UPN1 704A by transmitting a flow instruction to UPN1 704A using its IP address (i.e., IP address 2.2.2.2). As discussed above, the flow instruction may be based on a characteristic of the user traffic handled by the user gateway 708 associated with UPN1 704A.

Figure 8:
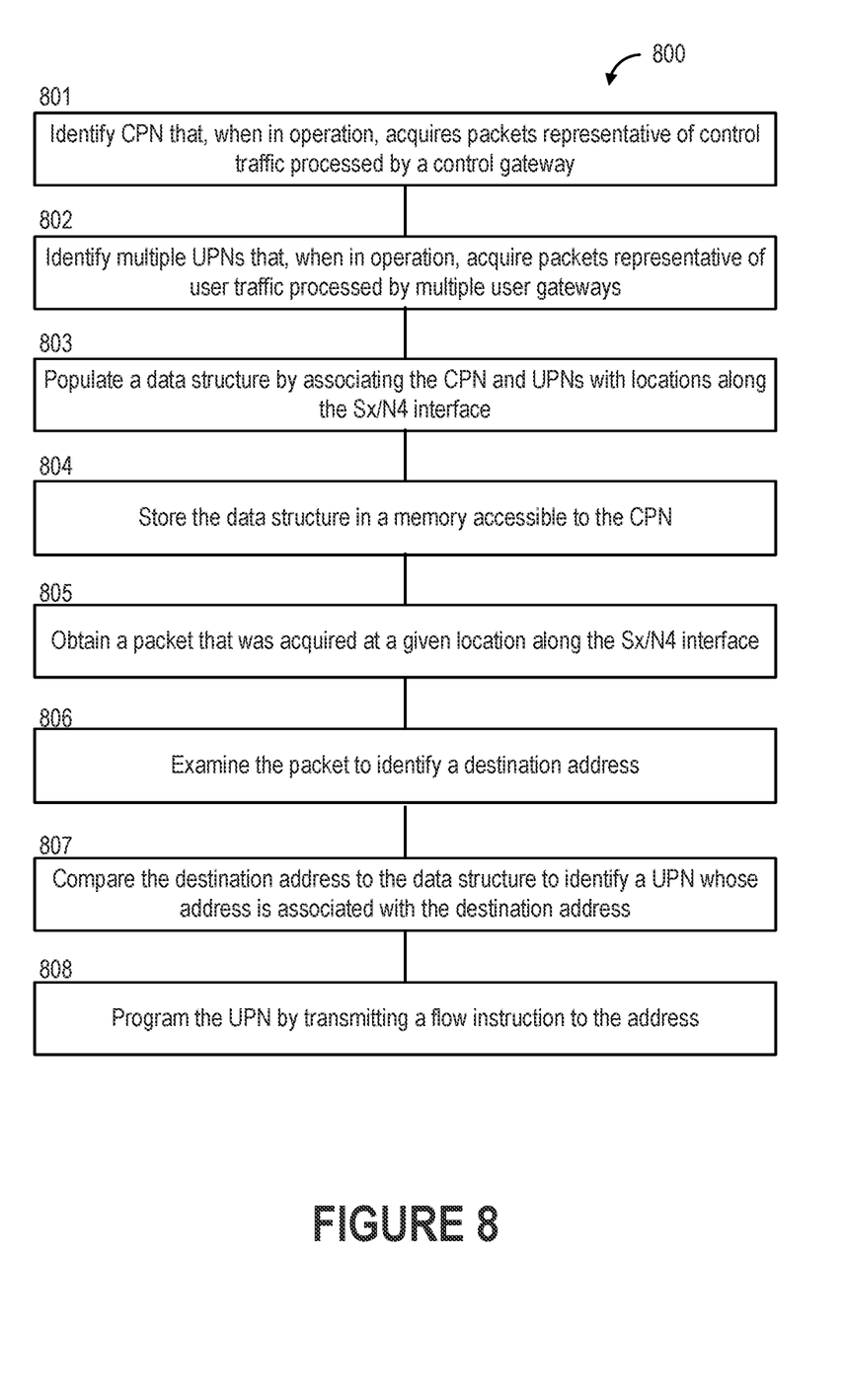
FIG. 8 depicts a flow diagram of a process for programming the UPNs responsible for processing the user traffic of an EPC with CUPS.

FIG. 8 depicts a flow diagram of a process 800 for programming the UPNs responsible for processing the user traffic of an Evolved Packet Core (EPC) with Control and User Plane Separation (CUPS). The process 800 may be partially or entirely performed by a CPN responsible for processing the control traffic of the EPC with CUPS. As discussed above, some steps in the process 800 may be performed by a fabric manager to which the CPN is communicatively coupled.

Initially, a visibility platform can identify a CPN that, when in operation, acquires packets representative of control traffic processed by a control gateway in the control plane of the EPC with CUPS (step 801). The control gateway may be a serving gateway or a packet data network gateway. The visibility platform can also identify multiple UPNs that, when in operation, acquire packets representative of user traffic processed by multiple user gateways in the user plane of the EPC with CUPS (step 802). Each UPN is a serving gateway or a packet data network gateway. Generally, each of the multiple UPNs is configured to receive packets representative of user traffic from one of the multiple user gateways.

Then, the visibility platform can populate a data structure associating the CPN and UPNs with locations along the Sx/N4 interface on which Sx/N4 traffic (also referred to as "session traffic") is exchanged between the control and user plane (step 803). These locations may be representative of the points along the Sx/N4 interface at which the Sx/N4 traffic processed by each node is acquired. For example, each entry in the data structure may associate an address (e.g., an IP address) of a node with an address of the location along the Sx/N4 interface at which the Sx/N4 traffic processed by the node is being acquired.

In some embodiments, the visibility platform automatically performs steps 801-803 on behalf of an administrator. For example, the CPN may be able to probe the visibility platform in order to identify the UPNs. In other embodiments, these steps are manually performed by an administrator responsible for managing the visibility platform. For example, the administrator may populate the data structure through an interface generated by a fabric manager (e.g., fabric manager 710 of FIG. 7).

The data structure can be stored in a memory that is accessible to the CPN (step 804). For example, if the CPN is a computer server, the data structure may be saved in the memory of the computer server. In some embodiments, the CPN is one of multiple CPNs included in the visibility platform. In such embodiments, the data structure may be saved in, or made accessible to, each of the multiple CPNs.

Thereafter, the CPN can obtain a packet that was acquired at a given location along the Sx/N4 interface (step 805). In some embodiments, the packet is a duplicate copy of an original packet included in the Sx/N4 traffic. The CPN can then examine the packet to identify a destination address (step 806). For example, the CPN may parse the packet to identify an IP address corresponding to its destination. The CPN can compare the destination address to the data structure to identify a UPN whose address is associated with the destination address (step 807).

Then, the CPN can program the UPN by transmitting a flow instruction to the address of the UPN (step 808). The flow instruction may specify where the user traffic acquired by the UPN should be next routed. For example, the flow instruction may specify one or more network tools to which at least some packets in the user traffic acquired by the UPN should be forwarded for analysis.

These steps may be performed in various sequences. For example, steps 801-804 may be performed periodically (e.g., by the visibility platform or administrator) to account for changes in the makeup of the visibility platform. As another example, the CPN may perform steps 805-806 for each packet acquired at the given location along the Sx/N4 interface so that new destinations can be discovered without delay. The discovery of new destinations may prompt the creation of new entries in the data structure.

Other steps may be included in some embodiments. For example, the CPN may continue to process control traffic acquired from the control gateway while the process 800 is performed. The control traffic may be forwarded to one or more network tools for analysis.

Processing System

Figure 9:
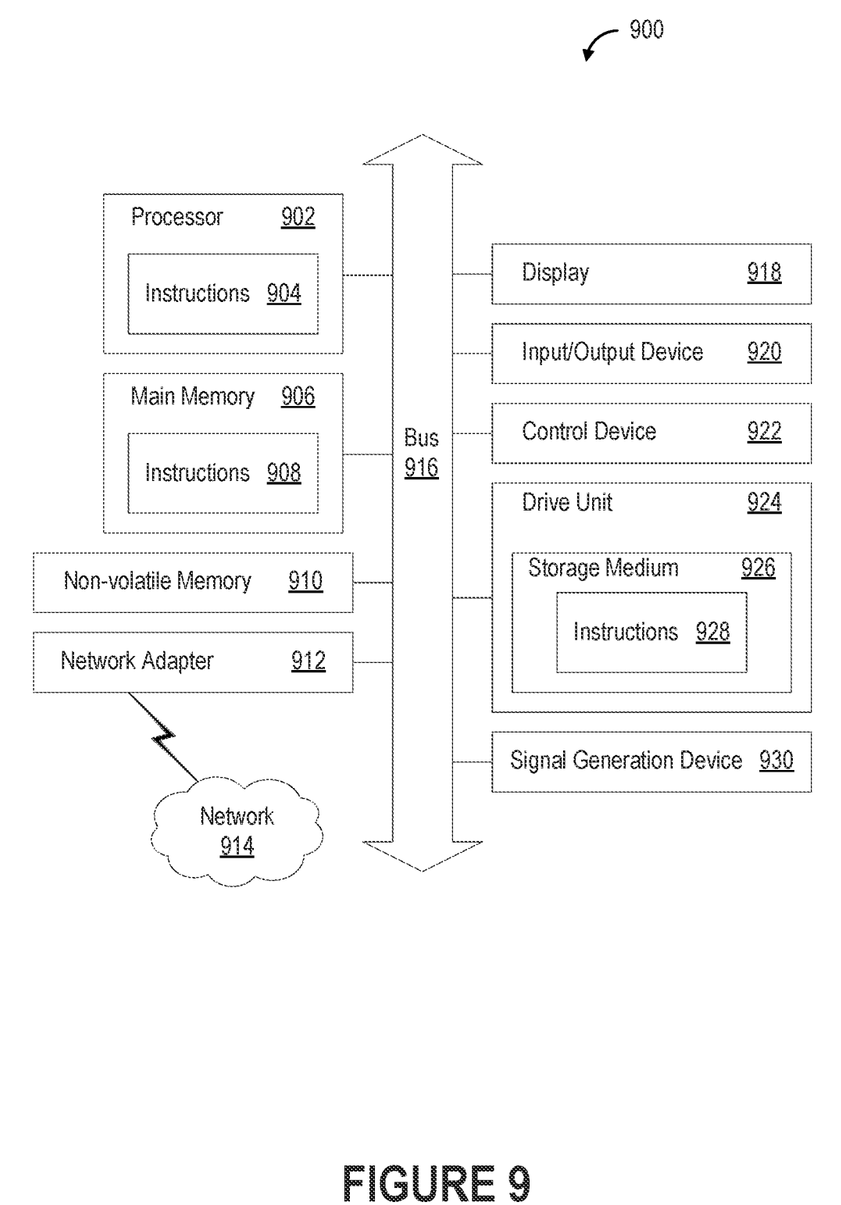
FIG. 9 includes a block diagram illustrating an example of a processing system in which at least some operations described herein can be implemented.

FIG. 9 includes a block diagram illustrating an example of a processing system 900 in which at least some operations described herein can be implemented. For example, the processing system 900 may be responsible for generating an interface through which an administrator manages the nodes of a visibility platform. As another example, at least a portion of the processing system 900 may be included in an electronic device (e.g., a computer server) that supports one or more CPNs and/or one or more UPNs. The processing system 900 may include one or more processors 902, main memory 906, non-volatile memory 91010, network adapter 912 (e.g., network interfaces), display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 900 operates as a standalone device, although the processing system 900 may be connected (e.g., wired or wirelessly) to other devices. For example, the processing system 900 may include a terminal that is coupled directly to a network appliance. As another example, the processing system 900 may be wirelessly coupled to the network appliance.

In various embodiments, the processing system 900 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 900.

While the main memory 906, non-volatile memory 91010, and storage medium 926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the processing system 900 and that cause the processing system 900 to perform any one or more of the methodologies of the presently disclosed embodiments.

In general, the routines that are executed to implement the technology may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in a computer, and that, when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 91010, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 912 enables the processing system 900 to mediate data in a network 914 with an entity that is external to the processing system 900, such as a network appliance, through any known and/or convenient communications protocol supported by the processing system 900 and the external entity. The network adapter 912 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A control processing node comprising:
   a network interface; and
   a processor configured to
      populate a data structure by associating each of a plurality of user processing nodes with a different address representative of a different location along an interface on which session traffic is exchanged between the control processing node and the plurality of user processing nodes;
      obtain a packet that was acquired at a given location along the interface;
      examine the data structure to identify an entry that identifies a user processing node whose address matches a destination address of the packet; and
      program the identified user processing node by transmitting a flow instruction to the address of the user processing node.

2. The control processing node of claim 1, wherein the control processing node is a computer server.

3. The control processing node of claim 1, wherein populating the data structure comprises:
   associating the control processing node with a location along the interface, and
   associating each user processing node of the plurality of user processing nodes with a different location along the interface.

4. The control processing node of claim 1, wherein:
   the control processing node is one of a plurality of control processing nodes, each of which acquires packets representative of control traffic processed by a different one of a plurality of control gateways in a control plane, and
   the control processing node is further configured to cause the data structure to be saved in each control processing node of the plurality of control processing nodes.

5. The control processing node of claim 1, wherein the control processing node is further configured to forward at least some of the control traffic to a network tool for analysis.

6. The control processing node of claim 5, wherein the flow instruction specifies where user traffic acquired by the user processing node should be next routed.

7. The control processing node of claim 1, wherein the interface is an Sx/N4 interface extending between control and user planes of an Evolved Packet Core (EPC) with Control and User Plane Separation (CUPS).

8. The control processing node of claim 7, wherein the control processing node is a serving gateway or a packet data network gateway.

9. The control processing node of claim 1, wherein the interface is an Sx/N4 interface extending between control and user planes of a 5G Next Generation Mobile Core Network (5GC).

10. The control processing node of claim 1, wherein the control processing node is operable to acquire packets representative of control traffic processed by a control gateway, and wherein the control gateway is a serving gateway or a packet data network gateway.

11. The control processing node of claim 10, wherein the control gateway is a Session Management Function.

12. A control processing node comprising:
    a processor; and
    a memory that includes instructions for processing session traffic exchanged between a control plane and a user plane via an interface;
    wherein the instructions, when executed by the processor, cause the control processing node to:
       obtain a packet that traversed the interface,
       examine a data structure to identify an entry that identifies a user processing node whose address matches a destination address of the packet, and
       transmit a flow instruction to the address of the user processing node whose address matches the destination address of the packet, the flow instruction indicating how incoming user traffic received by the user processing node should be handled.

13. The control processing node of claim 12, wherein the control processing node is a computer server.

14. The control processing node of claim 12, wherein the control processing node is operable to acquire packets representative of control traffic processed by a control gateway, and wherein the control gateway is a serving gateway or a packet data network gateway.

15. The control processing node of claim 12, wherein the flow instruction specifies where user traffic acquired by the user processing node should be next routed.

16. The control processing node of claim 12, wherein the interface is an Sx/N4 interface extending between the control and user planes of an Evolved Packet Core (EPC) with Control and User Plane Separation (CUPS).

17. A non-transitory storage medium with instructions stored therein, execution of which by a processor of a control processing node causes the control processing node to perform operations comprising:
    identifying a plurality of user processing nodes with which the control processing node is able to exchange session traffic via an interface;
    populating a data structure by associating each user processing node of the plurality of user processing nodes with a different address representative of a different location along the interface; and
    storing the data structure in the non-transitory storage medium.

18. The non-transitory storage medium of claim 17, wherein the control processing node is operable to acquire packets representative of control traffic processed by a control gateway, and wherein the control gateway is a serving gateway or a packet data network gateway.

19. The non-transitory storage medium of claim 17, further having stored therein instructions, execution of which by the processor of the control processing node causes the control processing node to transmit a flow instruction to an address of a user processing node of the plurality of user processing nodes, wherein the flow instruction specifies where user traffic acquired by the user processing node should be next routed.

20. The non-transitory storage medium of claim 17, wherein the interface is an Sx/N4 interface extending between control and user planes of an Evolved Packet Core (EPC) with Control and User Plane Separation (CUPS).

* * * * *